Patented Mar. 6, 1928.

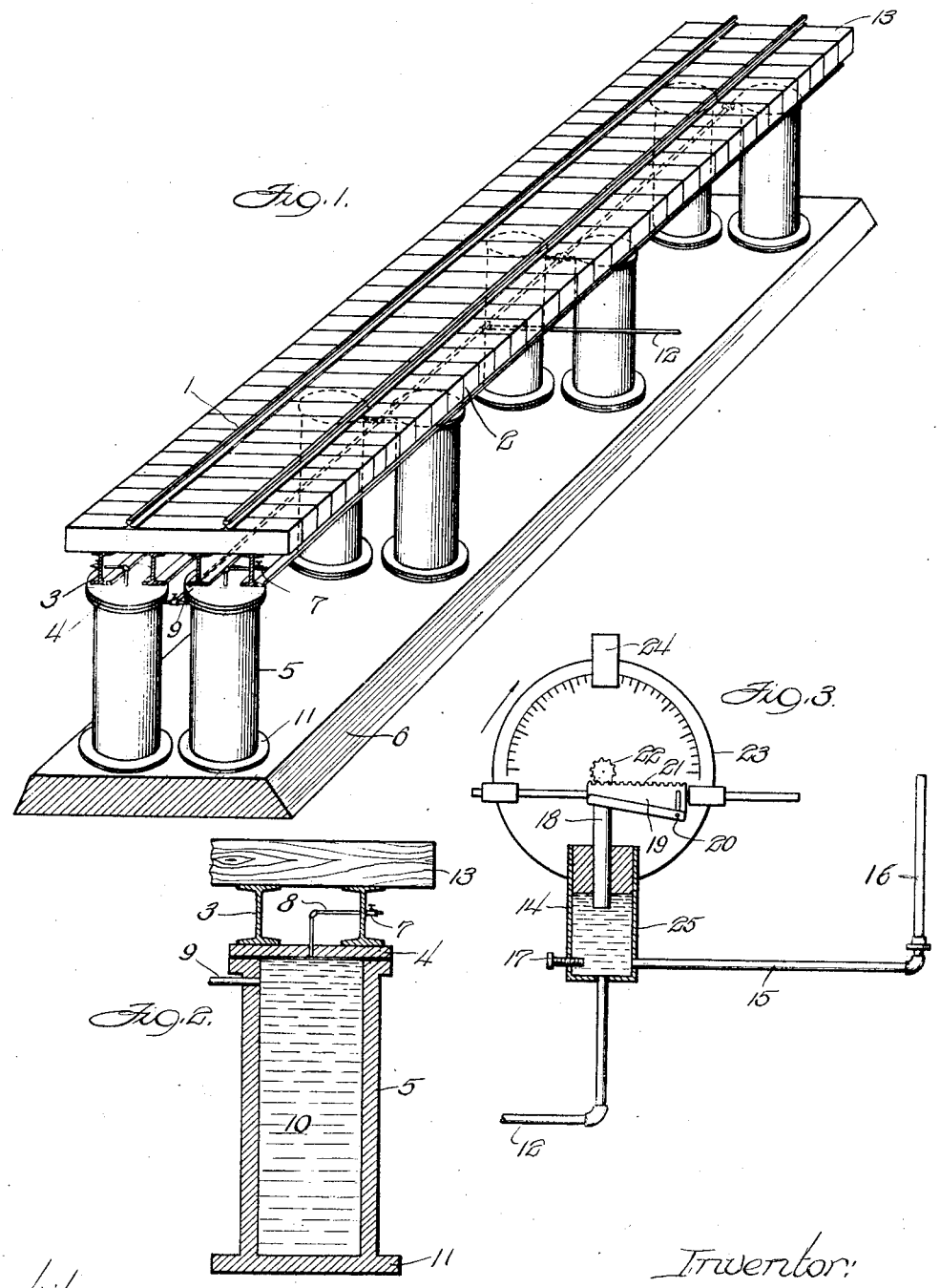

1,661,241

UNITED STATES PATENT OFFICE.

FRANK TROTT, OF HARVEY, ILLINOIS, ASSIGNOR TO HARRIETT V. TROTT, OF HARVEY, ILLINOIS.

WEIGHING SCALE.

Application filed May 5, 1924. Serial No. 711,166.

The main objects of this invention are to provide an accurate means and method of weighing based on measuring the variation in internal cavity volume of a hollow pier or supporting member due to the elasticity of the material forming it when such member is subjected to load.

Further objects of this invention are to provide a railroad weigh bridge supported on piers of such substantial construction that they will carry the full rated load with a maximum deflection of less than $\frac{1}{10}$ of one inch; that will be substantially as independent of weather conditions as any railroad bridge; that will have no moving or articulating parts to oil or repair; that will indicate weight by the displacement of a fluid; and that can utilize any convenient device for measuring the weight or volume of fluid displaced as a means for directly indicating the load on the weigh bridge.

A further and important object of this invention is to provide a weighing device in which the indicating means do not in any way contribute to the support of the load being weighed, the hydrostatic pressure of the fluid contained in the hollow supporting piers remaining the same at all times regardless of the load.

In the form shown, the supporting members are arranged to be compressed when subjected to an axial load, but it will be seen that the same principle can be utilized when the arrangement is such that the supporting members would be elongated by tension.

An illustrative embodiment of this invention is shown in the accompanying drawings, in which—

Fig. 1 is a perspective view of a weigh bridge mounted on piers supported on a rigid structure.

Fig. 2 is a sectional view of a pier supporting one end of a tie.

Fig. 3 is a diagrammatic illustration of a method of measuring liquid overflow from the piers and thereby indicating and recording the weight on the piers.

In the construction shown, railroad tracks 1 are laid upon ties 2 which are supported upon I-beams 3. The I-beams are in turn supported upon the head caps 4 of hollow piers or supporting members 5 and which are supported upon a foundation 6. The head caps 4 are tapped at the highest point and a pet cock 7 is connected to the tap hole by a pipe 8. Near the top of the pier is a pipe 9 connecting with a cavity 10 on the interior of the pier. This cavity or receptacle is formed in the pier by the head cap 4 and the base plate 11 of the pier. The pipe 9 is connected in multiple with similar pipes from each pier, all pipes being joined near the center with the pipe 12 leading out to one side of the weigh bridge 13 which is formed by the railroad tracks, ties and I-beams.

The pipe 12 is shown broken away in Fig. 1 and the same pipe, Fig. 3, is connected with the measuring receptacle 14 having an overflow pipe 15 and a vertical glass riser 16. The receptacle is provided with a level adjusting screw 17 and a plunger 18. The plunger 18 is provided with a bevel top which co-acts with a wedge 19. The slope of the wedge 19 is made adjustable by a set screw 20. Forward movement of the wedge is provided by a rack 21 and a pinion 22. The pinion 22 is the center of an indicating dial wheel 23 which is manually rotatable. The rotation of the dial wheel 23 controls the position of the plunger 18. A card 24 is placed near the rim of the dial wheel for the purpose of recording on the card any particular setting of the dial wheel 23.

In the operation, a non-compressible liquid 25 is poured into the receptacle 14, entirely filling the cavities 10 and all pipes, so that the liquid flows freely from the pet cocks 7. Then the pet cocks are closed and the level is adjusted to the zero mark on the riser pipe 16 by means of the adjusting screw 17 on the measuring receptacle.

In actual use when a load is placed upon the weigh bridge 13, the load is transmitted to the piers 5. Since the length of the pier is less than eight times the diameter of the pier the deformation or shortening of the piers is proportional to the stress, since the full load capacity is within the elastic limit of the material forming the piers and the compression of the walls of the pier follows Hooks law. The non-compressible liquid 25 flows freely and into and out of the cavities in the piers, the liquid plays no part in supporting the load upon the piers, nor is the liquid under enough compression, due to its vertical height, to have any effect due to static pressure in the piers themselves. With properly designed piers and the normal loads carried by a railroad weigh bridge, the actual compression of a pier will be less than $\frac{1}{10}$ of $1''$. With a compression of $\frac{1}{10}$ of $1''$ on any pier or multiple of piers, the quantity of liquid which will overflow from the enclosed cavity is sufficient to indicate the load or stress on the piers and is readable to values of $\frac{1}{10}$ of $1\%$ when approximating the normal load.

In this invention the non-compressible liquid filling the cavity is a non-weigh supporting means of indicating the stress upon the piers and the load upon the weigh bridge might be all at one end or at the other, evenly or unevenly distributed, and yet the total quantity of overflow is strictly proportional to the total load on the weigh bridge and gives the correct sum of the total weight supported by the piers. The piers are designed to follow the laws of piers and prisms when under axial stress and there is no tendency to bend or buckle. The space between the foundation and the weigh bridge might be under water or filled in with gravel or loose earth and not interfere with the operation of the weighing scale. In cases where sticky clay is encountered, if a wooden lagging is built around the pier, the space between the I-beam and the foundation might even be completely filled with sticky clay.

The weighing method shown in Fig. 3 comprises the following operation: Before the load comes on the weighing scale the dial wheel 23, or circular scale, is turned to zero and the plunger 18 will then be at its lowest position or wholly within the measuring receptacle 14. The level of the non-compressible liquid in the weighing device should then be adjusted to zero and the upright glass tube 16 by means of the adjusting thumb screw 17. Then by moving the dial wheel the plunger is withdrawn from the receptacle to provide a place for the incoming liquid. When the load comes on to the weigh bridge, the piers will be compressed slightly and the liquid contained in the cavities will be forced into the measuring receptacle. Finally by turning the circular scale the plunger will displace the liquid in the measuring receptacle and cause the liquid to rise to zero in the glass tube 16. When the liquid has reached the zero point, the graduation from the circular scale indicates the weight. Raised figures upon the circular scale and a suitable inking device, makes it possible to record on a card placed at a predetermined position, the weight carried by the weigh bridge.

It will be noted by those skilled in the art that in the construction shown the structure is as firm, rigid and dependable as the usual railway construction, independent of the fact that it is possible, by measuring the extremely slight compression which takes place in the pier, to determine with all of the accuracy required in weighing scales the weight carried on the structure, and that the liquid used to indicate, by its free movement, the pressure on the piers does not contribute to the support of the load carried by the piers. It will also be apparent from this construction that if once installed the earth can be restored to its normal position and it will be almost impossible to determine the position of the weigh bridge from any other piece of regular railroad track, other than the absence of fish plates.

It will be seen that numerous forms of apparatus for measuring the flow of liquid from the piers can be utilized to indicate the weight thereon, and that numerous details of the construction shown may be altered or omitted without departing from the spirit of this invention as defined by the following claims.

I claim:

1. A weighing device comprising a weigh bridge, rigid supporting means for said weigh bridge, and hydraulic means for indicating weight through changes in a dimension of said rigid supporting means due to the load on said weigh bridge, said hydraulic means playing no part in supporting said weigh bridge or load thereon.

2. A weighing device comprising a weigh bridge, a supporting pier for said weigh bridge having an enclosed cavity therein and fluid filling said cavity, said fluid being adapted to indicate by a free flow the change of volume of said cavity due to the load on said pier, and means to indicate the load on said weigh bridge through such fluid flow, said indicating means and fluid playing no part in supporting the load.

3. A weighing scale comprising fixed piers, a weigh bridge supported on said fixed piers, each of said piers having a cavity therein, a fluid in said cavity adapted through free flow to indicate the deformation of said piers when loaded and means actuated by said fluid for indicating said deformation in terms of load weight.

4. A railroad weigh scale of bridge structure comprising a weigh bridge, piers supporting said weigh bridge, said piers having cavities therein enclosed by fixed walls on all sides, fluid filling said cavities, an over-flow pipe connected to all said cavities, and means for measuring the over-flow and thereby indicating the sum of the loads carried by said piers.

Signed at Chicago this 28th day of April 1924.

FRANK TROTT.